United States Patent
Rakhimov

(10) Patent No.: US 6,200,501 B1
(45) Date of Patent: Mar. 13, 2001

(54) ELECTROCONDUCTIVE CERAMIC MATERIAL

(76) Inventor: Rustam Rakhimov, Ergashev Street, 54, Tashkent, 700084 (UZ)

( * ) Notice: Subject to any disclaimer, the term of this patent is extended or adjusted under 35 U.S.C. 154(b) by 0 days.

(21) Appl. No.: 09/486,775

(22) PCT Filed: May 27, 1998

(86) PCT No.: PCT/IB98/00824

§ 371 Date: Feb. 28, 2000

§ 102(e) Date: Feb. 28, 2000

(87) PCT Pub. No.: WO99/05077

PCT Pub. Date: Feb. 4, 1999

(30) Foreign Application Priority Data

Jul. 25, 1997 (UZ) .................................................. 9700645

(51) Int. Cl.$^7$ .............................. H01B 1/08; C04B 35/42
(52) U.S. Cl. ..................................... 252/521.1; 252/520.2; 252/520.5
(58) Field of Search .............................. 252/518.1, 520.2, 252/520.5, 521.1

(56) References Cited

U.S. PATENT DOCUMENTS 3,475,352 * 10/1969 Barbier et al. ....................... 252/521
5,864,576 * 1/1999 Nakatani et al. .................... 373/125

FOREIGN PATENT DOCUMENTS

93/26011 * 12/1993 (WO) .

* cited by examiner

Primary Examiner—Mark Kopec
(74) Attorney, Agent, or Firm—Abelman, Frayne & Schwab

(57) ABSTRACT

The invention relates to the filed of producing electroconductive ceramics on the basis of lanthanum chromite and intended for high-temperature applications (about 2000K). The object of the invention is to increase the heating rate of the ceramics, which will make it possible to reduce the time of the working operation, and ensure its improved thermal stability, which will increase the reliability of operation at high temperature. The goal is achieved by supplementing ceramics based on lanthanum chromite and containing zirconium dioxide, with alloying and stabilizing additives of lanthanum aluminate, yttrium chromite, magnesium chromite and cerium dioxide.

1 Claim, No Drawings

ELECTROCONDUCTIVE CERAMIC MATERIAL

The present invention relates to the field of producing high-temperature ceramics and can be used in manufacturing high-temperature heaters, semiconductors, thermocouples, temperature sensors, as additives in manufacturing conventional ceramics and in other fields requiring high thermal and chemical stability and high electric conductivity when operating in air, and in medical practice.

An electroconductive material is known on the basis of rare-earth chromites, such as lanthanum and/or yttrium chromite with additions of zirconium dioxide and rare-earth oxides, which is intended for stable operation at high temperatures, about 2000° K. In this case the amount of zirconium dioxide must exceed 5 mol %, preferably 30–50 mol % (see U.S. Pat. No. 3,475,352, "Electrically conductive ceramic material", national classification 252–520, published Oct. 28, 1969, which is taken as the analogue).

Better results are obtained with compositions containing 33 mol % $LaCrO_3$, 16 mol % $Gd_2O_3$, the rest being $ZrO_2$ (Composition 1) and 33 mol % $LaCrO_3$ and the rest, $ZrO_2$ (Composition 2). Hereinafter, the properties of the novel material are compared with those of the ceramics of the two compositions.

A serious shortcoming of the said ceramic material is its low permissible rate of heating, relatively low reliability of operation at 1600° C., and low thermal stability when operating at about 1500° C.

The closest analogue of the proposed invention which is taken as the prototype is an electroconductive ceramic material disclosed in patent application PCT/US93/05818, published WO 93/26011, Dec. 23, 1993, which contains the following ingredients, wt %:

| | |
|---|---|
| $MgAl_2O_4$ | 0.5–10.0 |
| $MgCrO_4$ | 1.0–15.0 |
| $CaZrO_3$ | up to 10.0 |
| $YCrO_3$ | up to 5.0 |
| $ZrO_2$ | up to 5.0 |
| $CeO_2$ | up to 1.0 |
| $LaCrO_3$ | the rest |

A shortcoming of the prototype is its relatively low emissivity.

The object of the present invention is to make an electroconductive material capable of being heated at a fast rate, having high reliability in operation at high temperature, and having high emissivity.

The goal is achieved by supplementing an electroconductive ceramic material containing magnesium chromite $MgCrO_4$, yttrium chromite $YCrO_3$, zirconium dioxide $ZrO_2$, cerium dioxide $CeO_2$, lanthanum chromite $LaCrO_3$, by lanthanum aluminate $LaAl_2O_4$, in the following ratio of ingredients, wt %:

| | | |
|---|---|---|
| lanthanum aluminate | $LaAl_2O_4$ | 0.5–10.0 |
| magnesium chromite | $MgCrO_4$ | 1.0–15.0 |
| yttrium chromite | $YCrO_3$ | 0.5–3.0 |
| zirconium dioxide | $ZrO_2$ | 0.5–5.0 |
| cerium dioxide | $CeO_2$ | 0.1–1.0 |
| lanthanum chromite | $LaCrO_3$ | the rest |

The material was obtained in the following manner. After preparing a charge of the necessary composition it was mixed in a planetary mill using Plexiglass drums and Teflon balls as milling bodies. The resulting powder was dried and melted in a solar furnace. The melt was cooled, ground and pressed into specimens of 50×6×6 mm in the middle and 50×6×12 mm at the ends for measuring maximum heating rate, of 40×4×4 mm for measuring electric conductivity, and of 15 mm in diameter and height for the rest of the tests. The specimens were sintered in a lanthanum chromite furnace it 1600° C. for 12 hours. The specimens thus prepared were held at 1500° C. for 60 hours for determining thermal stability at that temperature, and at 1600° C. for 20 hours for determining weight loss. To measure conductivity, the specimens of 40×4×4 mm were metallized at the ends.

To measure maximum heating rate the appropriate specimens were put in a corundum chamber and, after having a thermocouple attached to them, were energized and heated at various rates. Then the specimens were examined on a cross-section. When a certain heating rate was exceeded the specimens disintegrated owing to cracking at the surface and the inner layer melting through because of the low thermal conductivity and inverse temperature dependence of electric conductivity. The results obtained for various ceramic compositions are listed in Tables 1 to 11.

Given below are examples of preparing the ceramic material according to the present invention.

EXAMPLE 1

A charge was prepared of the following composition, wt %:

| | |
|---|---|
| lanthanum aluminate | 0.30 |
| yttrium chromite | 0.30 |
| magnesium chromite | 0.50 |
| cerium dioxide | 0.05 |
| zirconium dioxide | 0.30 |
| lanthanum chromite | the rest |

The charge was mixed in Plexiglass drums in a planetary mill using Teflon balls, dried, melted in a solar furnace, cooled, ground and pressed into specimens of various dimensions and shapes.

For measuring the maximum heating rate, plates were used of 50×6×6 mm in the middle and 50×6×12 mm at the ends.

For measuring electric conductivity, plates of 40×4×4 mm were used.

For measuring weight loss and thermal stability, cylinders of 15 mm in diameter and height were used.

The specimens were sintered in a lanthanum chromite furnace at 1600° C. for 12 hours. Then they were held at 1500° C. for 60 hours to determine thermal stability at that temperature, and at 1600° C. for 20 hours to measure weight loss. The specimens of 40×4×4 mm, for measuring electric conductivity, were metallized at the ends.

In measuring maximum heating rate the specimens—plates with a different thickness in the middle and at the ends—were put in a corundum chamber, had a thermocouple attached to them, were energized and heated at various rates. Then the specimens were examined on a cross-section. When heated at a rate of 5K/min the specimens were in a good condition, but at a rate of 10K/min they exhibited cracking.

The weight loss after 20 hours hold at 1600° C. was 1.2%, which is twice as much than the analogue material was. The electric resistivity was 312.6 Ohm×cm. The compressive strength after 60 hours hold at 1500° C. decreased from 72.6 MPa to 18.4 MPa.

Thus, almost all the properties of this composition turned out to be inferior to those of the analogue and of the prototype.

EXAMPLE 2

The ceramic material was prepared in the same way as in Example 1, except that the ceramic composition was that given in column II of Table 1. In that case all the properties of the novel ceramic material were better than those of the analogue and on a par with those of the prototype (see Table 1).

EXAMPLE 3

All the steps followed were the same as in Example 1, except that the ceramic composition was that given in column III of Table 1. In that case all the properties of the target material were greatly improved with respect to the analogue: maximum heating rate increased 5 times, weight loss decreased to 0.2%, resistivity decreased to 8.2 Ohm× cm, compressive strength was 144.1 MPa, and its degradation after 60 hours hold at 1500° C. was only 3.8. With respect to the prototype, the properties were on a par.

EXAMPLE 4

All the steps followed were the same as in Example 1, except that the composition was that given in column IV of Table 1. In that case the main properties of the novel material were also higher than those of the analogue, except resistivity, and on a par with those of the prototype.

EXAMPLE 5

All the steps followed were the same as in Example 1, except that the composition was that given in column V of Table 1. Resistivity increased so much that a specimen could not be sufficiently heated to measure maximum heating rate.

EXAMPLE 6

All the steps followed were those of Examples 1 to 5, except that all the compositions used the minimal (Table 2) and maximal (Table 3) concentrations of lanthanum aluminate. As can be seen from the data given, the main properties for columns II to IV of the tables exceed those of the analogue and are on a par with those of the prototype.

EXAMPLE 7

All the steps followed were those of Examples 1 to 6, except that all the compositions of the novel ceramic used the minimal (Table 4) and maximal (Table 5) concentrations of yttrium chromite. As can be seen from the data given, the main properties for columns II to IV of the tables exceed those of the analogue and are on a par with the prototype.

EXAMPLE 8

All the steps followed were those of Examples 1 to 7, except that all the compositions of the novel ceramic used the minimal (Table 6) and maximal (Table 7) concentrations of magnesium chromite. As can be seen from the data given, the main properties for columns II to IV of the tables exceed those of the analogue and are on a par with the prototype.

EXAMPLE 9

All the steps followed were those of Examples 1 to 8, except that all the compositions of the novel ceramic used the minimal (Table 8) and maximal (Table 9) concentrations of cerium dioxide. As can be seen from the data given, the main properties for columns II to IV of the tables exceed those of the analogue and are on a par with the prototype.

EXAMPLE 10

All the steps followed were those of Examples 1 to 9, except that all the compositions of the novel ceramic used the minimal (Table 10) and maximal (Table 11) concentrations of zirconium dioxide. As can be seen from the data given, the main properties for columns II to IV of the tables exceed those of the analogue and of the prototype.

Given below are tables comparing properties for various compositions of the novel ceramic material with the corresponding properties for the analogue and prototype materials.

TABLE 1

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 0.30 | 0.50 | 1.50 | 3.00 | 4.00 | |
| magnesium chromite | 0.50 | 1.00 | 10.00 | 15.00 | 20.00 | |
| cerium dioxide | 0.05 | 0.50 | 0.50 | 1.00 | 2.00 | |
| zirconium dioxide | 0.30 | 0.50 | 3.00 | 5.00 | 6.00 | |
| lanthanum chromite | the rest | the rest | the rest | the rest | the rest | |
| maximum heating rate, K/min | 5 | 15 | 50 | 20 | — | 10 |
| weight loss, % | 1.2 | 0.5 | 0.2 | 0.3 | 1.0 | 0.55 ~ 0.6 |
| resistivity, Ohm × cm | 312.6 | 124.0 | 8.2 | 934.5 | 2368.3 | 50 ~ 4800 |
| compressive strength, MPa | 72.6 | 96.3 | 144.1 | 120.1 | 115.6 | 96 ~ 135 |
| compressive strength, MPa (1 500° C./60 h) | 18.4 | 71.4 | 140.3 | 33.2 | 26.2 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 2

| Ingredients and main properties | Ingredient content, wt % | | | | | |
|---|---|---|---|---|---|---|
| | I | II | III | IV | V | VI |
| lanthanum aluminate | 0.50 | 0.50 | 0.50 | 0.50 | 0.50 | analogue |
| yttrium chromite | 0.30 | 0.50 | 1.50 | 3.00 | 4.00 | |
| magnesium chromite | 0.50 | 1.00 | 10.00 | 15.00 | 20.00 | |
| cerium dioxide | 0.10 | 0.50 | 0.50 | 1.00 | 1.00 | |
| zirconium dioxide | 0.30 | 0.50 | 3.00 | 5.00 | 6.00 | |
| lanthanum chromite | the rest | the rest | the rest | the rest | the rest | |
| maximum heating rate, K/min | 5 | 15 | 50 | 20 | — | 10 |
| weight loss, % | 1.0 | 0.5 | 0.2 | 0.3 | 1.0 | 0.55 ~ 0.6 |
| resistivity, Ohm × cm | 325.8 | 124.0 | 7.9 | 719.3 | 2134.9 | 50 ~ 4800 |

TABLE 2-continued

| | | | | | | |
|---|---|---|---|---|---|---|
| compressive strength, MPa | 74.2 | 96.3 | 136.2 | 118.1 | 110.4 | 96 ~ 135 |
| compressive strength, MPa (1 500° C./60 h) | 18.7 | 71.4 | 130.5 | 33.1 | 25.1 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 3

| Ingredients and main properties | Ingredient content, wt % | | | | | |
|---|---|---|---|---|---|---|
| | I | II | III | IV | V | VI |
| lanthanum aluminate | 10.00 | 10.00 | 10.00 | 10.00 | 10.00 | analogue |
| yttrium chromite | 0.30 | 0.50 | 1.50 | 3.00 | 4.00 | |
| magnesium chromite | 0.50 | 1.00 | 10.00 | 15.00 | 20.00 | |
| cerium dioxide | 0.10 | 0.20 | 0.50 | 1.00 | 2.00 | |
| zirconium dioxide | 0.30 | 0.50 | 3.00 | 5.00 | 6.00 | |
| lanthanum chromite | the rest | the rest | the rest | the rest | the rest | |
| maximum heating rate, K/min | 5 | 15 | 50 | 20 | — | 10 |
| weight loss, % | 1.0 | 0.5 | 0.2 | 0.3 | 1.0 | 0.55 ~ 0.6 |
| resistivity, Ohm × cm | 524.6 | 427.7 | 59.1 | 934.5 | 1987.8 | 50 ~ 4800 |
| compressive strength, MPa | 112.6 | 98.8 | 152.8 | 120.1 | 103.2 | 96 ~ 135 |
| compressive strength, MPa (1 500° C./60 h) | 29.6 | 81.4 | 143.2 | 33.2 | 38.6 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 4

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 0.50 | 0.50 | 0.50 | 0.50 | 0.50 | |
| magnesium chromite | 0.50 | 1.00 | 10.00 | 15.00 | 20.00 | |
| cerium dioxide | 0.05 | 0.10 | 0.50 | 1.00 | 2.00 | |
| zirconium dioxide | 0.30 | 0.50 | 3.00 | 5.00 | 6.00 | |
| lanthanum chromite | the rest | the rest | the rest | the rest | the rest | |
| maximum heating rate, | 5 | 15 | 50 | 20 | — | 10 |
| weight loss, % | 1.2 | 0.5 | 0.2 | 0.3 | 1.0 | 0.55 ~ 0.6 |

TABLE 4-continued

| | | | | | | |
|---|---|---|---|---|---|---|
| resistivity, Ohm × cm | 289.4 | 124.0 | 37.6 | 876.9 | 2178.2 | 50 ~ 4800 |
| compressive strength, MPa | 72.6 | 96.3 | 144.1 | 120.1 | 115.6 | 96 ~ 135 |
| compressive strength, MPa (1 500° C./60 h) | 18.4 | 71.4 | 140.3 | 33.2 | 26.2 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 5

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 3.00 | 3.00 | 3.00 | 3.00 | 3.00 | |
| magnesium chromite | 0.50 | 1.00 | 10.00 | 15.00 | 20.00 | |
| cerium dioxide | 0.05 | 0.10 | 0.50 | 1.00 | 2.00 | |
| zirconium dioxide | 0.30 | 0.50 | 3.00 | 5.00 | 6.00 | |
| lanthanum chromite | the rest | the rest | the rest | the rest | the rest | |
| maximum heating rate, K/min | 5 | 15 | 40 | 20 | — | 10 |
| weight loss, % | 1.2 | 0.5 | 0.2 | 0.3 | 1.6 | 0.55 ~ 0.6 |
| resistivity, Ohm × cm | 378.6 | 235.7 | 26.7 | 934.5 | 2368.3 | 50 ~ 4800 |
| compressive strength, MPa | 82.7 | 93.7 | 121.2 | 120.1 | 125.8 | 96 ~ 135 |
| compressive strength, MPa (1 500° C./60 h) | 19.9 | 62.8 | 87.3 | 33.2 | 28.7 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength. MPa | 89–144 |
| compressive strength, MPa (1 500° C./60 h) | 21–143 |

TABLE 6

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 0.25 | 0.50 | 1.50 | 3.00 | 4.00 | |
| magnesium chromite | 1.00 | 1.00 | 1.00 | 1.00 | 1.00 | |
| cerium dioxide | 0.05 | 0.10 | 0.50 | 1.00 | 2.00 | |
| zirconium dioxide | 0.30 | 0.50 | 4.50 | 5.00 | 6.00 | |
| lanthanum chromite | the rest | the rest | the rest | the rest | the rest | |
| maximum heating rate, K/min | 5 | 15 | 40 | 20 | — | 10 |

TABLE 6-continued

| | | | | | | |
|---|---|---|---|---|---|---|
| weight loss, % | 1.2 | 0.5 | 0.2 | 0.3 | 1.0 | 0.55 ~ 0.6 |
| resistivity, Ohm × cm | 201.7 | 124.0 | 19.3 | 927.8 | 2199.6 | 50 ~ 4800 |
| compressive strength, MPa | 92.5 | 96.3 | 117.8 | 102.3 | 98.7 | 96 ~ 135 |
| compressive strength, MPa (1 500° C./60 h) | 37.4 | 51.4 | 60.3 | 21.1 | 13.1 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 7

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 0.30 | 0.50 | 2.50 | 3.00 | 4.00 | |
| magnesium chromite | 15.00 | 15.00 | 15.00 | 15.00 | 15.00 | |
| cerium dioxide | 0.05 | 0.10 | 0.50 | 1.00 | 2.00 | |
| zirconium dioxide | 0.30 | 0.50 | 3.00 | 5.00 | 6.00 | |
| lanthanum chromite | the rest | the rest | the rest | the rest | the rest | |
| maximum heating rate, K/min | 5 | 15 | 30 | 20 | — | 10 |
| weight loss, % | 1.2 | 0.5 | 0.2 | 0.3 | 1.0 | 0.55 ~ 0.6 |
| resistivity, Ohm × cm | 301.7 | 212.8 | 23.7 | 934.5 | 2221.9 | 50 ~ 4800 |
| compressive strength, MPa | 87.3 | 96.3 | 98.1 | 120.1 | 105.3 | 96 ~ 135 |
| compressive strength, MPa (1 500° C./60 h) | 81.2 | 90.6 | 90.3 | 33.2 | 25.1 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 8

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 0.30 | 0.50 | 1.50 | 3.00 | 4.00 | |
| magnesium chromite | 0.50 | 1.00 | 9.00 | 15.00 | 20.00 | |
| cerium dioxide | 0.10 | 0.10 | 0.10 | 0.10 | 0.10 | |
| zirconium dioxide | 0.30 | 0.50 | 3.00 | 5.00 | 6.00 | |
| lanthanum chromite | the rest | the rest | the rest | the rest | the rest | |
| maximum heating rate, K/min | 10 | 15 | 40 | 20 | — | 10 |

TABLE 8-continued

| | | | | | | |
|---|---|---|---|---|---|---|
| weight loss, % | 1.2 | 0.5 | 0.2 | 0.3 | 1.0 | 0.55 ~ 0.6 |
| resistivity, Ohm × cm | 317.8 | 124.0 | 8.7 | 922.5 | 2245.9 | 50 ~ 4800 |
| compressive strength, MPa | 72.1 | 96.3 | 144.0 | 120.3 | 115.0 | 96 ~ 135 |
| compressive strength, MPa (1 500° C./60 H) | 18.4 | 71.4 | 140.3 | 33.2 | 26.2 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 9

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 0.30 | 0.50 | 2.00 | 3.00 | 4.00 | |
| magnesium chromite | 0.50 | 1.00 | 10.00 | 15.00 | 20.00 | |
| cerium dioxide | 1.00 | 1.00 | 1.00 | 1.00 | 1.00 | |
| zirconium dioxide | 0.30 | 0.50 | 4.00 | 5.00 | 6.00 | |
| lanthanum chromite | the rest | the rest | the rest | the rest | the rest | |
| maximum heating rate, K/min | 5 | 15 | 40 | 20 | — | 10 |
| weight loss, % | 1.2 | 0.5 | 0.2 | 0.3 | 1.0 | 0.55 ~ 0.6 |
| resistivity, Ohm × cm | 308.7 | 118.0 | 11.3 | 934.5 | 2566.6 | 50 ~ 4800 |
| compressive strength, MPa | 71.9 | 89.3 | 134.5 | 120.1 | 107.6 | 96 ~ 135 |
| compressive strength, MPa (1 500° C./60 h) | 16.7 | 67.5 | 112.4 | 33.2 | 21.5 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 10

| Ingredients and main properties | Ingredient content, wt % | | | | | |
|---|---|---|---|---|---|---|
| | I | II | III | IV | V | VI |
| lanthanum aluminate | 0.30 | 0.50 | 3.00 | 10.00 | 12.00 | analogue |
| yttrium chromite | 0.30 | 0.50 | 2.50 | 3.00 | 4.00 | |
| magnesium chromite | 0.50 | 1.00 | 10.00 | 15.00 | 20.00 | |
| cerium dioxide | 0.05 | 0.10 | 1.00 | 1.00 | 2.00 | |
| zirconium dioxide | 0.50 | 0.50 | 0.50 | 0.50 | 0.50 | |
| lanthanum chromite | the rest | the rest | the rest | the rest | the rest | |
| maximum heating rate, K/min | 5 | 15 | 50 | 20 | — | 10 |

TABLE 10-continued

| | | | | | | |
|---|---|---|---|---|---|---|
| weight loss, % | 0.9 | 0.5 | 0.3 | 0.4 | 1.0 | 0.55 ~ 0.6 |
| resistivity, Ohm × cm | 372.8 | 124.0 | 7.1 | 768.3 | 1987.7 | 50 ~ 4800 |
| compressive strength, MPa | 92.6 | 96.3 | 123.1 | 103.3 | 89.8 | 96 ~ 135 |
| compressive strength, MPa (1 500° C./60 h) | 21.3 | 71.4 | 101.6 | 36.9 | 32.2 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

TABLE 11

| Ingredients and main properties | Ingredient content, wt % | | | | | |
|---|---|---|---|---|---|---|
| | I | II | III | IV | V | VI |
| lanthanum aluminate | 0.30 | 0.50 | 1.00 | 10.00 | 12.00 | analogue |
| yttrium chromite | 0.30 | 0.50 | 1.50 | 3.00 | 4.00 | |
| magnesium chromite | 0.50 | 1.00 | 10.00 | 15.00 | 20.00 | |
| cerium dioxide | 0.05 | 0.10 | 0.50 | 1.00 | 2.00 | |
| zirconium dioxide | 5.00 | 5.00 | 5.00 | 5.00 | 5.00 | |
| lanthanum chromite | the rest | the rest | the rest | the rest | the rest | |
| maximum heating rate, K/min | 5 | 15 | 30 | 20 | — | 10 |
| weight loss, % | 0.3 | 0.3 | 0.2 | 0.3 | 1.0 | 0.55 ~ 0.6 |
| resistivity, Ohm × cm | 423.6 | 294.3 | 57.8 | 934.5 | 2124.9 | 50 ~ 4800 |
| compressive strength, MPa | 96.6 | 112.3 | 152.1 | 120.1 | 109.7 | 96 ~ 135 |
| compressive strength, MPa (1 500° C./60 H) | 16.2 | 61.2 | 121.4 | 33.2 | 30.2 | 10.2 ~ 16.1 |

| | prototype |
|---|---|
| maximum heating rate, K/min | 15–50 |
| weight loss, % | 0.2–0.5 |
| resistivity, Ohm × cm | 7.0–873 |
| compressive strength, MPa | 89–144 |
| compressive strength, MPa (1 500° C./60 h) | 21–143 |

One of the fundamental operational characteristics of high-temperature heaters is their emissivity, that is, the capacity to give off heat better, which is characterized by the density of the heat flux dissipated by the working surface of the heater when there is a temperature difference between the heater and the environment.

The amount of energy emitted off the working surface coated by a ceramic material, in other words, the emissivity of a ceramic material, depends on the composition of ceramic material.

The emissivity of the proposed electroconductive ceramic material and that of the prototype were determined by the method of comparing the temperatures of these materials when they were heated to the same temperatures and in identical conditions of the environment.

For this purpose were used two identical aluminium plates both measuring 100×25×2 mm and both having a thermal conductivity of 150 W/mK.

While keeping them in identical conditions, one plate was covered with the prototype material, and the other with an electroconductive ceramic material according to the present invention. The coating was applied in the following manner: the ceramic material was ground, mixed with a binder based on soluble glass, and the resultant mass was uniformly applied to the plates on both sides, except where a heating element and temperature sensor were to be attached to. The coated area of each plate was 45 cm$^2$, the total surface area of each plate being 50 cm$^2$.

To heat each plate, we used a heating element measuring 25×5×1 mm and having a resistivity of 440 Ohm.

At the centre of each plate, a spring clamp was used to attach the heating element on one side, and the temperature sensor on the other; a special heat-conductive paste was used to reduce the heat resistance between the heating element and the plate, and between the plate and the temperature sensor.

Thus, the heater and the temperature sensor were separated by the plate 2 mm thick.

Temperature sensor readings characterize the extent of heat carried away from the heating element. As can be seen from the description of the design of the plate to be investigated, heat removal from the heating, element was carried out via the surface of the plate coated with the ceramic material.

A number of tests were run, and in each, different wattage was supplied to the heating elements. In each test both the heating element mounted on the plate coated with the prototype material and that mounted on the plate coated with the proposed electroconductive ceramic material were supplied with the same wattage, and the measurements at the same wattage supplied were conducted simultaneously, in identical conditions of the environment.

The energized heating element was kept on until an equilibrium heat state was reached, indicated by the constancy of the temperature measured over time.

Thus, by comparing the readings of the temperature sensor obtained on the plate coated with the prototype material with the readings of the temperature sensor obtained on that coated with the proposed electroconductive ceramic material, the emissivity of the ceramic material could be assessed, since the wattages supplied to the plates were identical, and the less a plate was heated, i.e. the lower its temperature as measured by the temperature sensor, the higher was the emissivity of the ceramic material.

The results of the measurements are listed in Table 12.

TABLE 12

| Voltage, V | Wattage, W | Temperature $T_1$ of the plate coated with the prototype material, ° C. | Temperature $T_2$ of the plate coated with the electroconductive ceramic material, ° C. | $T_1 - T_2$, ° C. |
|---|---|---|---|---|
| 120 | 32.72 | 189 | 175 | 14 |
| 110 | 27.5 | 174 | 160 | 14 |
| 100 | 22.73 | 160 | 147 | 13 |
| 90 | 18.41 | 145 | 132 | 13 |
| 80 | 14.55 | 130 | 118 | 12 |

As can be seen from the data listed in Table 12, the temperature of the plate coated with the electroconductive ceramic material according to the present invention turned out to be lower than that of the plate coated with the prototype material, when the same wattage was supplied to the heating elements.

The tests were conducted at different values of wattage supplied. All the readings of the temperature sensors consistently show the significantly higher emissivity of the ceramic material according to the present invention compared with the prototype ceramic material.

As can be seen from the tables, for the analogue material obtained by the same technology, maximum heating rate is 10 degrees per minute, weight loss is 0.55 to 0.6%, resistivity is 50 to 4800 Ohm×cm, compressive strength is 96 to 135 MPa, and compressive strength after a 60-hour hold at 1500° C. is 10.2 to 16.1 MPa.

Thus, compared with the analogue material, the use of this new electroconductive ceramic material enables one to increase maximum heating rate 5 times, reduce weight loss 3 times (these two parameters are the principal shortcomings of the analogue), and decrease compressive strength degradation after a 60-hour hold at 1500° C. 9 times while increasing this property about 1.5 times.

For the prototype material obtained by the technique described above maximal heating rate is 15–50° C./min, weight loss 0.2–0.5%, resistivity 7 to 873 Ohm×cm, compressive strength 89 to 144 MPa, and compressive strength after a 60-hour hold at 1500° C., 21 to 143 MPa.

As can be seen from the data given (Tables 1–11), using the proposed electroconductive material in compare with the prototype material enables one to retain the excellent properties of the electroconductive ceramic material, such as heating rate, weight loss, resistivity, compressive strength, compressive strength after a 60-hour hold at 1500° C., while increasing its emissivity (Table 12).

What is claimed is:

1. An electroconductive ceramic material containing magnesium chromite, yttrium chromite, zirconium dioxide, cerium dioxide, lanthanum chromite, whose distinguishing feature is that it also contains lanthanum aluminate in the following ratio of ingredients, wt %:

| | |
|---|---|
| lanthanum aluminate $LaAl_2O_4$ | 0.50~10.0 |
| magnesium chromite $MgCrO_4$ | 1.0~15.0 |
| yttrium chromite $YCrO_3$ | 0.50~3.0 |
| zirconium dioxide $ZrO_2$ | 0.50~5.0 |
| cerium dioxide $CeO_2$ | 0.1~1.0 |
| lanthanum chromite $LaCrO_3$ | reaminder. |

* * * * *